United States Patent
Patronen et al.

(10) Patent No.: US 6,292,661 B1
(45) Date of Patent: Sep. 18, 2001

(54) METHOD OF IMPLEMENTING A HANDOVER IN A CELLULAR RADIO SYSTEM

(75) Inventors: Petri Patronen; Harri Posti, both of Oulu (FI); Jari Ryynänen, Beijing (CN); Marko Silventoinen, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/341,992
(22) PCT Filed: Feb. 25, 1998
(86) PCT No.: PCT/FI98/00170
§ 371 Date: Sep. 21, 1999
§ 102(e) Date: Sep. 21, 1999
(87) PCT Pub. No.: WO98/38824
PCT Pub. Date: Sep. 3, 1998

(30) Foreign Application Priority Data

Feb. 27, 1997 (FI) .......................................... 970841

(51) Int. Cl.⁷ .............................. H04B 1/26; H04B 7/00; H04Q 7/20
(52) U.S. Cl. ..................... 455/436; 455/436; 455/438; 455/439; 455/442; 455/452; 455/525
(58) Field of Search ................................... 455/436–439, 455/440, 442, 444, 452, 525; 370/321, 322, 328, 347

(56) References Cited

U.S. PATENT DOCUMENTS

| | | | |
|---|---|---|---|
| 5,809,422 | * 9/1998 | Raleigh et al. | 455/449 |
| 5,844,894 | * 12/1998 | Dent | 370/330 |
| 5,913,168 | * 7/1999 | Moreau et al. | 455/441 |
| 6,130,886 | * 10/2000 | Ketseoglou et al. | 370/347 |

FOREIGN PATENT DOCUMENTS

| | | | |
|---|---|---|---|
| 0702462 | 3/1996 | (EP) . | |
| 0702462 A1 | * 3/1996 | (EP) | H04B/7/08 |
| 9524810 | 9/1995 | (WO) . | |

* cited by examiner

Primary Examiner—Daniel Hunter
Assistant Examiner—Meless Zewdu
(74) Attorney, Agent, or Firm—Pillsbury & Winthrop LLP

(57) ABSTRACT

The invention relates to a method of implementing a handover in a cellular radio system. The cellular radio system has at least on cell (Cd) which comprises at least two subcells and in which all available frequencies are dynamically used. The cellular radio system comprises in each cell (C, Cd) at least one base station (BTS) which communicates with subscriber terminals (MS) located within its area. A handover from an old cell to a new cell (Cd) applying dynamic channel allocation is characterized in that only BCCH carrier frequency time slots comprising control channels are transmitted all the time in all subcells of the cell(Cd). The method allows traffic channels of a BCCH carrier frequency to be dynamically reused in subcells of the cell (Cd), providing the improved system capacity.

5 Claims, 2 Drawing Sheets

| 0 BCCH | 1 TCH | 2 TCH | 3 TCH | 4 TCH | 5 TCH | 6 TCH | 7 TCH |

METHOD OF IMPLEMENTING A HANDOVER IN A CELLULAR RADIO SYSTEM

FIELD OF THE INVENTION

The invention relates to a method of implementing a handover in a cellular radio system, the system comprising: in each cell, at least one base station which communicates with subscriber terminals located within its area, which transmits at least at one carrier frequency and which broadcasts information about itself on control channels to subscriber terminals; in at least one cell, at least two subcells which comprise an antenna unit and in which all available frequencies are dynamically used; and, at each frequency, a signal to be transmitted, the signal being divided on a time-division basis into frames comprising a plural number of time slots; the base station measuring through all antenna units the power level of a traffic channel used by a subscriber terminal, on the basis of which an antenna unit providing the strongest signal is selected for communication.

The invention also relates to a method of implementing a handover in a cellular radio system, the system comprising: in each cell, at least one base station which communicates with subscriber terminals located within its area, which transmits at least at one carrier frequency, and which broadcasts information about itself on control channels to subscriber terminals; in at least one cell, at least two subcells which comprise an antenna unit and in which all available frequencies are dynamically used; and, at each frequency, a signal to be transmitted, the signal being divided on a time-division basis into frames comprising a plural number of time slots; the base station measuring through all antenna units the strength of a signal of a subscriber terminal on a traffic channel of an old cell, an antenna unit providing the strongest signal being selected on the basis of the measurements for a handover to a new cell.

DESCRIPTION OF RELATED ART

In cellular radio systems, a user's speech and data between a base station and a subscriber terminal are transmitted on a traffic channel. Between a base station and a subscriber terminal are also needed various control messages and system information, which are transmitted on control channels. An example of a control channel that can be mentioned is a BCCH channel, which is used in the GSM system for transmitting connection set-up information from a base station to subscriber terminals.

In the current GSM system, a carrier frequency that comprises a BCCH channel, i.e. a BCCH carrier frequency, is transmitted uninterruptedly at a constant power level. A subscriber terminal continuously measures the power level of the BCCH carrier frequencies transmitted by adjacent base stations and reports the measurement results to the base station serving the subscriber terminal. On the basis of the measurement results, the system decides an appropriate moment for a handover to another base station.

Effective utilization of a frequency spectrum is one of the main objectives in cellular radio systems. Most channel allocation methods are based on the reuse of frequencies beyond a given interference distance. The conventional GSM system is implemented by using Fixed Channel Allocation (FCA). In this method the frequencies available for use in the system are divided into groups and fixedly allocated to different cells. The frequency groups can be reused in cells which are at a sufficient distance from each other. The reuse distance is determined by the level of co-channel interference that the system tolerates.

If the traffic load estimate concerning each cell is correct and the traffic loads do not vary greatly, fixed channel allocation functions reasonably well in macrocells, i.e. in cells the size of which is between one kilometer and several dozens of kilometers. A disadvantage in fixed channel allocation is that precise and laborious frequency planning is required to allow co-channel interference to be minimised. In addition, fixed channel allocation adjusts poorly to variations in traffic loads.

The above disadvantages in fixed channel allocation are emphasised in cellular radio systems with a small cell size, such as office systems, where variations in radio traffic load are usually larger than in macrocell systems, which complicates radio network planning. The load of radio traffic grows strongly in environments using small cells, and the network should be able to easily adapt to the increase in traffic. The adding of new cells to a network applying fixed channel allocation requires, however, that frequency planning as a whole is renewed.

BRIEF SUMMARY OF THE INVENTION

To obtain a solution to the above-mentioned problems, a more flexible and more adjustable channel allocation method than the one provided by fixed channel allocation is required. In the purest form of Dynamic Channel Allocation (DCA), all frequencies of the system are available in every cell. No frequency group is allocated to a particular base station; instead, all channels can be taken in use at any base station. Channel selection can be made at the moment of call set-up on the basis of the interference situation at the time concerned. The major advantages of dynamic channel allocation are its flexibility in connection with different traffic loads and its greater efficiency in the utilization of the frequency spectrum. In addition, frequency planning is no longer needed. As cell size diminishes, the advantages of and the need for dynamic channel allocation become further emphasised.

An intermediate form of fixed and dynamic channel allocation is a channel allocation method in which some of the channels are fixedly allocated and others are dynamically available. Also in such a method the advantages offered by dynamic channel allocation can be utilized.

In cellular radio systems that comprise not only conventional cells but also cells applying dynamic channel allocation, handover situations involve technical solutions that require particular attention. A cell applying dynamic channel allocation comprises at least two subcells which, in turn, comprise an antenna unit. When a handover to a cell applying dynamic channel allocation is performed in the system, the system does not know which antenna unit in the new cell is closest to the subscriber terminal involved in the handover. In a cell applying dynamic channel allocation a BCCH carrier frequency is therefore usually transmitted through all antenna units. But because of this, the traffic channels of the BCCH carrier frequency cannot be reused within the area of the cell, so the system capacity is not the best possible. In addition to the above mentioned problem, the limited number of traffic channels in a BCCH carrier frequency also sets a permanent upper limit to the handover capacity of a dynamic cell.

An object of the present invention is thus to implement a handover in a cellular radio system so as to provide improved system capacity.

This is achieved with a method described in the preamble, characterized in that only BCCH carrier frequency time slots comprising control channels are transmitted in a cell all the time through all antenna units; and characterized in that in a handover situation, a base station controller controlling the cell selects in the cell for the handover a traffic channel which is not in use within the area of the cell, and the base station of the cell starts to transmit the traffic channel through all antenna units, the handover to the cell being performed thereafter to the traffic channel concerned; and characterized in that through an antenna unit selected for communication the base station measures the quality of all traffic channels available in the cell, on the basis of which a traffic channel is selected for communication and a handover to the traffic channel concerned is performed.

Alternatively, a method of the invention is characterized in that only those BCCH carrier frequency time slots which comprise control channels are transmitted through all antenna units; and characterized in that in a handover situation, a base station controller controlling a cell informs the base station about the traffic channel used by the subscriber terminal in an old cell; and characterized in that through an antenna unit selected for a handover to a new cell, the base station measures the quality of all traffic channels available in the new cell, on the basis of which a traffic channel is selected for the handover, the handover being performed thereafter to the selected antenna unit and traffic channel of the new cell.

The method of the invention provides clear advantages. The method allows traffic channels of a BCCH carrier frequency to be reused in subcells of a cell applying dynamic channel allocation, thereby providing improved system capacity.

BRIEF DESCRIPTION OF THE FIGURES

In the following the invention will be described in greater detail with reference to examples in the attached drawings, in which.

DETAILED DESCRIPTION OF THE FIGURES

Figures 1, 2:
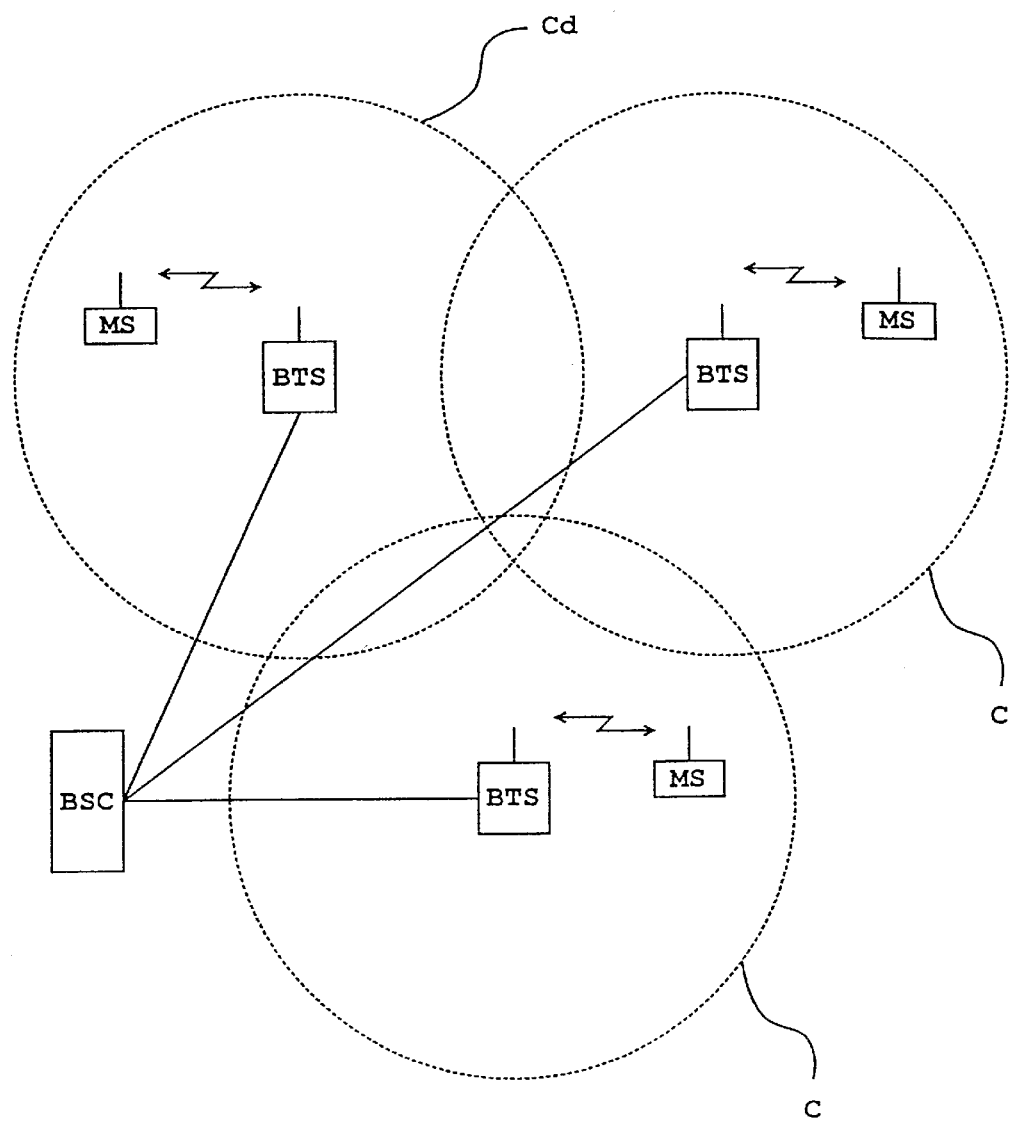
FIG. 1 illustrates a cellular radio system, to which a method of the invention can be applied.
FIG. 2 illustrates a structure of a time-division frame in the current GSM system.

FIG. 1 illustrates a cellular radio system, to which the method of the invention can be applied. In FIG. 1 cells C represent a conventional cell of the GSM system, whereas a cell Cd represents a cell applying dynamic channel allocation. In the cellular radio system, each cell has at least one base station BTS, which communicates with subscriber terminals MS located within its area. A base station controller BSC, in turn, controls the operation of one or more base stations BTS. in cellular radio systems, a user's speech and data traffic between a base station and a subscriber terminal is transmitted on traffic channels. Between a base station and a subscriber terminal are also needed various control messages and system information, which are transmitted on control channels. The method of the invention can be applied to any cellular radio system utilizing a time-division multiple access system TDMA. Although in the following description the method of the invention is applied to the GSM system, it is not restricted to the system.

FIG. 2 illustrates a structure of a BCCH carrier frequency frame of the current GSM system. A BCCH carrier frequency frame comprises eight time slots which are numbered from 0 to 7. Control channels are typically sent in the first time slot of the frame, the time slot being indicated by the number 0. Control channels can, however, be also sent in several time slots. Examples of control channels include a BCCH channel, which is used in the GSM system for transmitting connection set-up information from a base station to subscriber terminals, and an SDCCH channel, which is used for transmitting connection set-up information between a base station and a subscriber terminal before a traffic channel is allocated. In the example in FIG. 2, time slots from 1 to 7 of a BCCH carrier frequency are used for transmitting traffic channels TCH.

Figure 3:
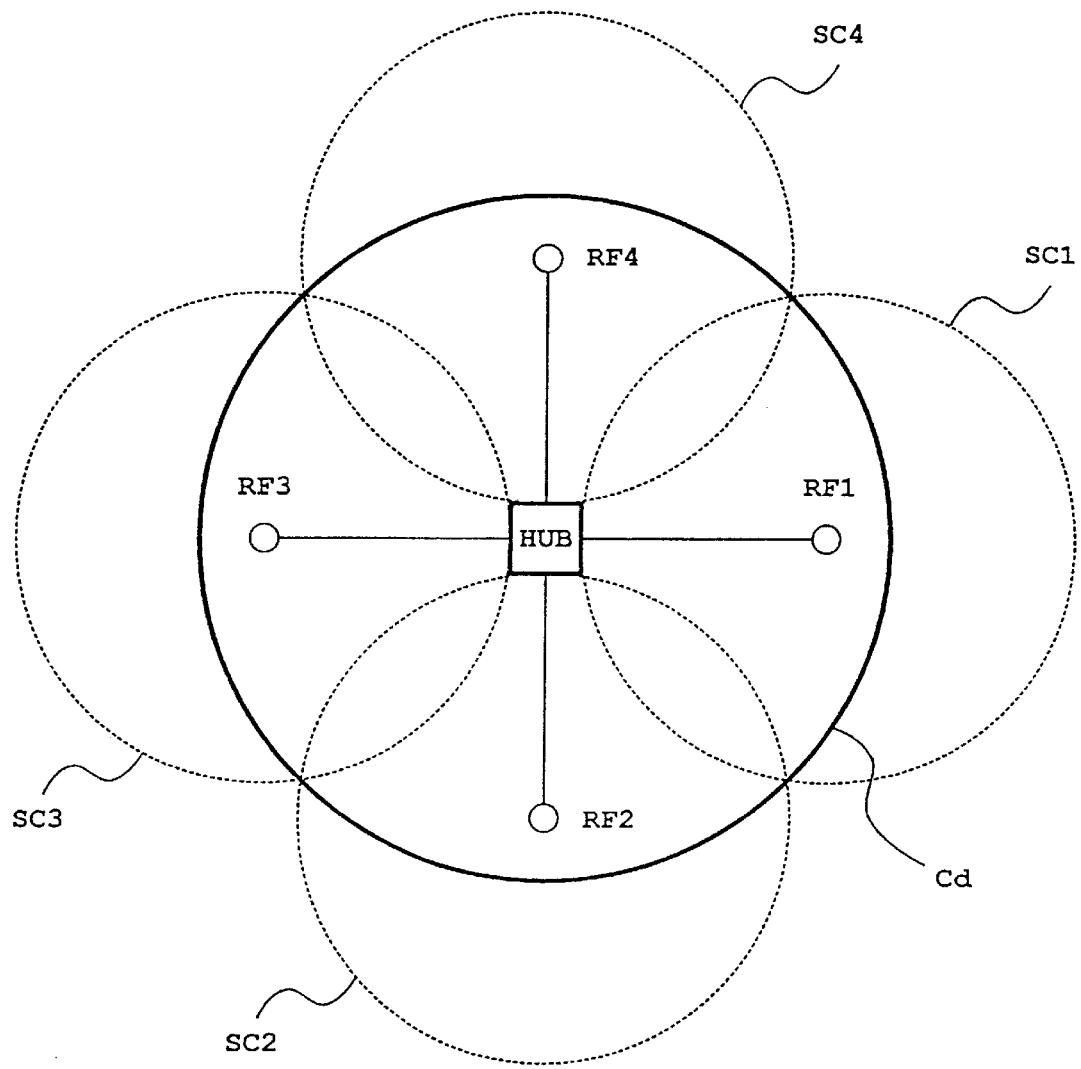
FIG. 3 illustrates a structure of a cell applying dynamic channel allocation.

FIG. 3 illustrates a structure of a cell Cd applying dynamic channel allocation. The cell Cd comprises a base station hub HUB, and the cell Cd is divided into subcells SC1–SC4 comprising antenna units RF1–RF4. An example of a practical implementation could be an office building that forms, as a whole, a single cell, the floors of the building each forming one subcell.

In cellular radio systems that comprise not only conventional cells but also cells Cd applying dynamic channel allocation, handover situations involve technical solutions that require particular attention. In the method of the invention, only BCCH carrier frequency time slots comprising control channels BCCH and SDCCH are transmitted all the time through all antenna units RF1–RF4 of the cell Cd. Traffic channels of the BCCH carrier frequency, however, can be dynamically used in subcells SC1–SC4 of the cell Cd, which improves the system capacity.

As a subscriber terminal arrives in the vicinity of a new cell Cd applying dynamic channel allocation and a handover from the old cell to the new cell Cd is needed, the base station controller controlling the cell Cd selects for the handover a traffic channel in the cell Cd which is not in use within the area of the cell Cd at the moment of the handover. A base station of the cell Cd starts to transmit the traffic channel in question through all antenna units RF1–RF4, after which the system performs the handover to the cell Cd, to the traffic channel concerned. Through all antenna units RF1–RF4 the base station measures the power level of the traffic channel used by the subscriber terminal, on the basis of which an antenna unit providing the strongest signal is selected for communication. The base station measures through the antenna unit selected for communication the quality of all traffic channels available for use in the cell Cd and the most suitable traffic channel is selected on the basis of the measurement for communication, after which the system performs a handover to the traffic channel concerned. A criterion for the selection of the most suitable traffic channel can be for instance to select the traffic channel having the least interference, the selection being then based on measurements of the level of interference. Also other characteristics and measurements to be made on the basis of them can serve as selection criteria. The measurements can then be used for selecting for instance the first traffic channel that meets the selection criteria. The selected traffic channel can be in use also in another subcell SC1–SC4 of the cell Cd.

As a subscriber terminal arrives in the vicinity of a new cell Cd applying dynamic channel allocation and a handover from the old cell to the new cell Cd is needed, the base station controller controlling the cell Cd can, alternatively, provide to the base station of the cell Cd information about the traffic channel used by the subscriber terminal in the old cell. Through all antenna units RF1–RF4 the base station measures the strength of the subscriber terminal signal on the traffic channel in the old cell, an antenna unit providing the strongest signal being selected on the basis of the measurements for the handover to the new cell Cd. The base station measures through the selected antenna unit the quality of all traffic channels available for use in the new cell Cd, on the basis of which the most suitable traffic channel is selected for the handover. A criterion for the selection of the most suitable traffic channel can be for instance to select the traffic channel having the least interference, the selection being then based on measurements of the level of interference. Also other characteristics and measurements to be made on the basis of them can serve as selection criteria. The measurements can then be used for selecting for instance the first traffic channel that meets the selection criteria. The system then performs the handover to the pre-selected antenna unit and traffic channel in the new cell Cd. Traffic channel quality measurements can also be performed in advance at regular intervals, the measurement results being then stored for later use.

The old and the new cell Cd are to be temporally synchronised with each other or the timing difference between the cells must be known to the system.

Although the invention is described above with reference to an example according to the attached drawings, it is apparent that the invention is not restricted to the example, but it can be modified in many ways within the inventive idea disclosed in the attached claims.

What is claimed is:

1. A method of implementing a handover in a cellular radio system, the system including a plurality of cells each including at least one corresponding base station configured to communicate with subscriber terminals located within the cell area, transmit at least at one carrier frequency and broadcast information about the base station on control channels to subscriber terminals, at least one cell including at least two subcells each including an antenna unit and in which all available frequencies are dynamically used and, wherein a signal to be transmitted at each frequency is divided on a time-division basis into frames including a plurality of time slots, the method comprising:

measuring, through all antenna units of a new cell, a power level of a traffic channel of an old cell used by a subscriber terminal;

selecting an antenna unit of the new cell providing the strongest signal based on the measured power level of the traffic channel;

selecting a traffic channel which is not being used within the area of the new cell, the selecting being performed by a base station controller controlling the new cell;

starting transmitting of the selected unused traffic channel through all the antenna units of the new cell, the transmitting being started by the base station of the new cell;

performing the handover to the new cell using the selected traffic channel; and selecting a new traffic channel in the new cell from among the available traffic channels in the new cell based on traffic channel quality measurements performed by the base station of the new cell through the selected antenna unit;

wherein, control channels are included in only BCCH carrier frequency time slots all the time through all antenna units in each cell.

2. A method of implementing a handover in a cellular radio system, the system including a plurality of cells each including at least one corresponding base station configured to communicate with subscriber terminals located within an area associated with the corresponding cell, transmit at least at one carrier frequency and broadcast information about the base station on control channels to subscriber terminals, at least one cell including at least two subcells that each include an antenna unit and in which all available frequencies are dynamically used and, wherein a signal to be transmitted at each frequency is divided on a time-division basis into frames including a plurality of time slots, the method comprising:

measuring, through all antenna units of a new cell, a strength of a signal of a subscriber terminal on a traffic channel of an old cell;

selecting an antenna unit of the new cell providing the strongest signal, based on the measurements of signal strength;

providing information about the traffic channel used by the subscriber terminal in the old cell to a base station of the new cell;

measuring a quality of traffic channels available in the new cell through the selected antenna unit of the new cell;

selecting a traffic channel of the new cell for handover to the new cell based on the new cell traffic channel quality measurements; and performing the handover to the new cell using the selected antenna unit and selected traffic channel of the new cell, wherein control channels are included in only BCCH carrier frequency time slots through all antenna units included in each cell.

3. The method of claim 2, wherein the performing of traffic channel quality measurements is performed at regular intervals and the method further comprises storing results of the tic channel quality measurements.

4. The method of claim 2, wherein the old cell and the new cell involved in the handover are temporally synchronised with each other.

5. The method of claim 2, wherein a timing difference between the old cell and the new cell involved in the handover is known.

* * * * *